I. DODENHOFF.
Corn Harvester.
No. 17,729.
2 Sheets—Sheet 1.
Patented July 7, 1857.
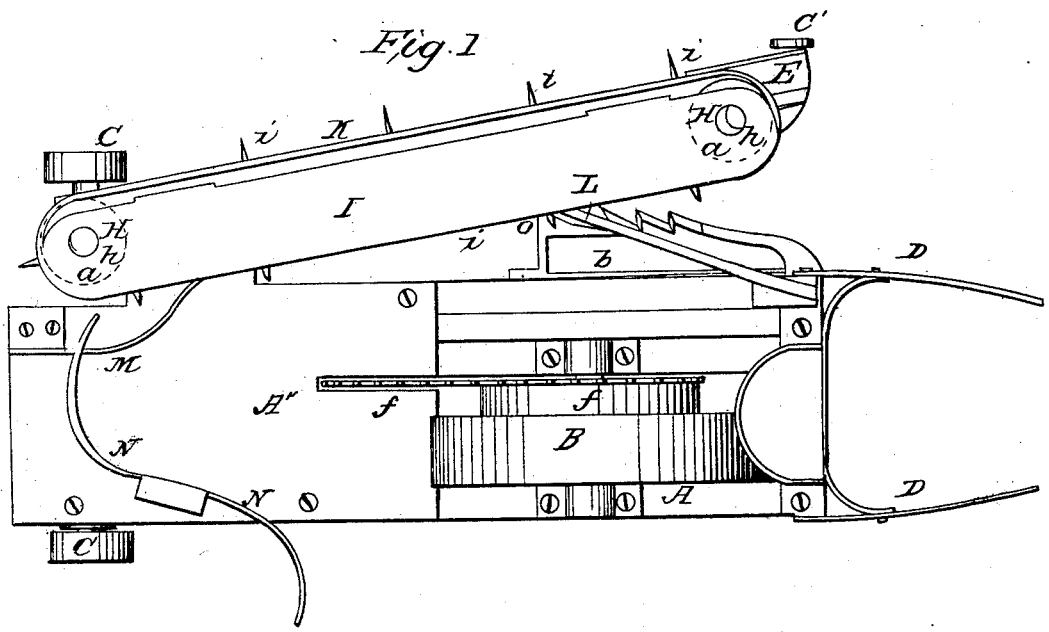
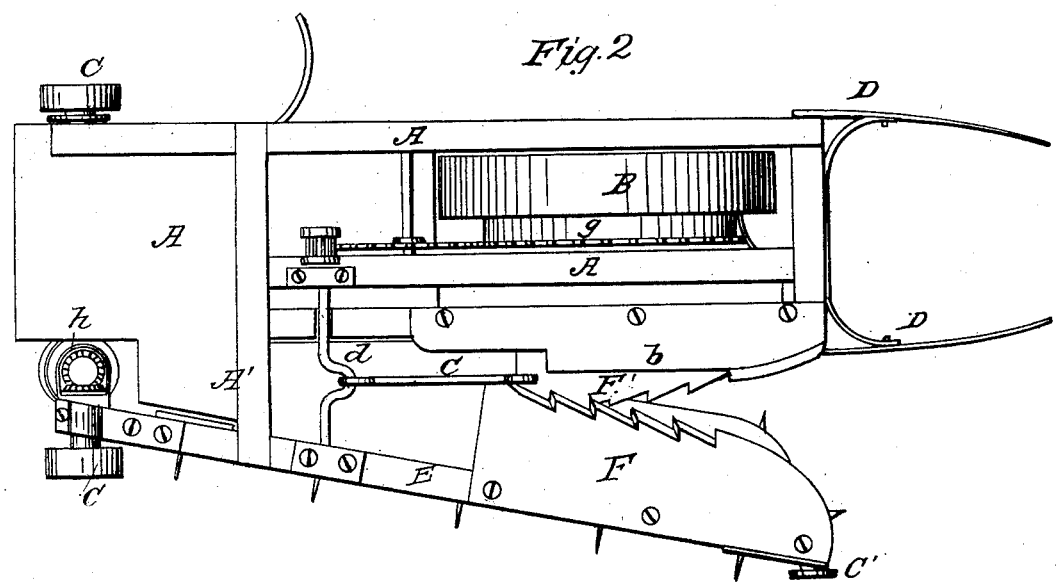

I. DODENHOFF
Corn Harvester.
No. 17,729.
2 Sheets—Sheet 2.
Patented July 7, 1857.
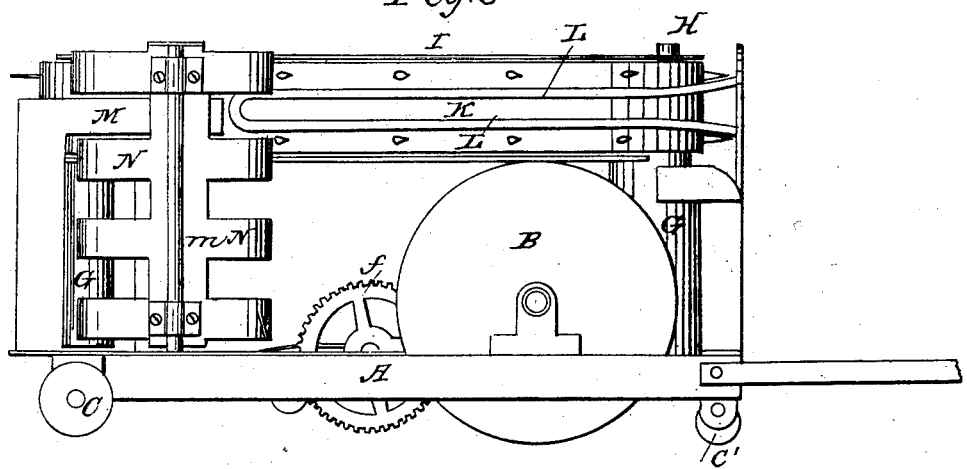
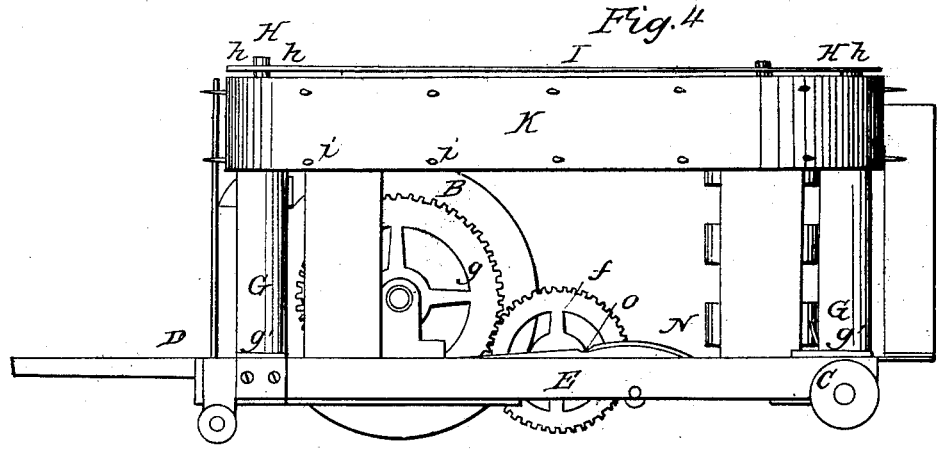

UNITED STATES PATENT OFFICE.

ISRAEL DODENHOFF, OF BLOOMINGTON, ILLINOIS.

IMPROVEMENT IN CORN-HARVESTERS.

Specification forming part of Letters Patent No. 17,729, dated July 7, 1857.

*To all whom it may concern:*

Be it known that I, ISRAEL DODENHOFF, of Bloomington, in the county of McLean and State of Illinois, have invented a new and useful Improvement in Maize-Harvesters, of which the following is a full, clear, and exact description, reference being had to the accompanying drawings, in which—

Figure 1 represents a top view of my machine with one set of cutters and gathering apparatus. Fig. 2 represents a bottom view of the same. Fig. 3 represents a side elevation of the same, and Fig. 4 a similar view taken from the other side of the same.

The nature of my invention consists, first, in a peculiar shape of the knives and arrangement in relation to each other, whereby they are made to cut as well in their forward as in their backward stroke; secondly, in the arrangement and combination of an endless belt armed with spikes, with bearing-bars or spring-guides, by means of which the corn is held in an upright position during the operation of cutting, and transported and deposited in that position upon a reel arranged in the rear of the machine for this purpose, and by which it is supported until sufficient has been collected to form a shock.

To enable others skilled in the art to make, construct, and use my invention, I will proceed to describe it in detail, premising it with the statement that the drawings merely show a machine having one set of cutting and gathering apparatus, whereas, as a general thing, they will be made with two, one on either side of the driving-wheel; but as both are constructed and operated precisely like each other it was deemed unnecessary to exhibit it or to describe it more particularly, any further than to state that one will be, as a rule, arranged slightly in advance of the other—say about eighteen inches—although they may be in a line with each other, if desired; but the former is preferred, as it will not strain the machine or horses so much as where both are cutting simultaneously.

The main frame A of the machine is supported in front by the large driving-wheel B, and in rear by two small supporting-wheels, C. To the front end of this frame are secured the shafts D in any suitable manner. To the cross-beam A', at its rear end, and which projects considerably beyond the sides of the main frame, are secured beams E, extending forward to a point slightly in advance of the front of the frame A, and forming an angle with its sides. This beam or supplementary frame is supported in front and rear upon wheels C and C'. Upon the lower side of the front end of this beam the stationary knife F is secured by rivets, screws, or otherwise, the other blade or knife, F', being arranged and working in guideways $b$, secured to the side of the front end of the main frame A, motion being communicated to it by means of a pitman-rod, $c$, secured to the crank $d$, the latter receiving motion from the pinion $e$, secured on its inner end, it in turn being driven by a spur-wheel, $f$, gearing into another cogged wheel, $g$, secured to the side of the main driving-wheel B, or by any other suitable arrangement of mechanism for the purpose. The cutters F and F' are arranged so as to overlap each other and diverge slightly toward the outside—or, in other words, are set at an angle to each other—the space formed by their lap and divergence for the reception of the corn to be cut forming an acute angle. These knives are provided with teeth, the shorter sides of which are perpendicular, or nearly so, to their base line, and the longer sides oblique thereto, their point of junction forming an acute angle, the teeth themselves being arranged in a line forming an acute angle with the back of the knife. The edges of these teeth are beveled down to a cutting-edge, and may or may not be serrated, as desired, those of the upper knife, F', being beveled on the upper side, while those of the other, F, are beveled on the under side. Knives arranged and serrated on this plan meet in cutting like the edges of shears, whether in their forward or backward motion, and yet act so as to prevent the stalks of corn from slipping back out of reach of the knives.

To the front and rear end of the beam E are secured brackets $g'$, in which bearings are formed for the journal H of the shafts G, upon the upper end of which are secured pulleys $a$, the upper end of the shafts G being supported and working in bearings $h$ formed in the upper beam, I, of the frame E, standards or brackets $g'$ for its support being secured at their lower ends to the beam E. Round the pulleys $a$ passes a belt, K, armed with spikes $i$, which receive motion from a miter-wheel, $k$, secured to the lower end of the shaft G of the rear pulley, which, gearing into another miter-wheel, $l$, secured upon the shaft of the wheel C, that supports one side of the rear of the frame, is driven by the progressive motion of the machine. These pulleys are so adapted that the endless belt K will travel backward with the same speed as the machine is advancing.

Upon the front end of the main frame A rises a standard, to the top of which spring-bars L are secured. These bars as they leave the standard pass in a line parallel with the angle or set of the knife F until it reaches the belt K, whence it is deflected backward in a line parallel with the latter, until it reaches the end of a convex guide-bar, M, secured to the rear end of the platform A. These bars L, in conjunction with the armed belt, guide the corn into the knives and support it while being cut, and keep it in an upright position while it is being carried back by the spikes of the belt until it reaches the convex guide M, whence it is carried and deposited in the curved arms of a collector, N, where it remains until sufficient has been gathered to form a shock, when it may be secured by band, and then deposited upon the ground, the reel or collector N rotating upon its shaft $m$ for this purpose; or it may be deposited in a bundle on the ground first and tied afterward, if thought more advisable. When the last plan is pursued the reel can be made to work automatically or not, as desired, either by the weight of the grain or in any well-known manner. In order to prevent the stalks from interfering after they are cut with the operative parts of the cutting apparatus, an inclined plate, O, projects over the rear end of the knives, up which the stalks are carried or dragged by the endless belt K and spring guide-bars L until they rest upon the top of the main frame, whence they are carried to the collector, which may be provided with any required number of arms (in this instance two are shown) for this purpose.

Similar cutting, carrying, and gathering apparatus to that just described may be arranged and secured on the other side of the driving-wheel B, a suitable seat for the driver being arranged immediately in front of the wheel upon the cross-beam of the main frame.

Having thus described my invention, what I claim as new, and desire to secure by Letters Patent, is—

1. The arrangement of the knives in relation to each other when combined with the peculiar shape of the teeth, for the purposes substantially as herein set forth.

2. The armed belt K and spring guide-bars L, for holding, guiding, and carrying the corn, so as to deposit in the arms of the collector N in the rear of the machine, in combination with the cutting apparatus, the whole being arranged in relation to each other in the manner substantially as set forth.

In testimony whereof I herewith set my hand this 10th day of March, A. D. 1857.

ISRAEL DODENHOFF.

Witnesses:
 JESSE BIRCH,
 DAVID BRIER.